United States Patent [19]

Long

[11] 4,311,040
[45] Jan. 19, 1982

[54] POWER CYLINDER BALANCER UNIT

[76] Inventor: Bryan R. Long, 276 Silver Brook Way NW., Calgary, Canada, T3B 5G8

[21] Appl. No.: 152,718

[22] Filed: May 23, 1980

[51] Int. Cl.³ .................... G01M 15/00; G01L 9/00
[52] U.S. Cl. ..................... 73/115; 73/708; 73/753
[58] Field of Search ............. 73/115, 35, 753, 754, 73/708, DIG. 4, 723

[56] References Cited

U.S. PATENT DOCUMENTS

| | | | |
|---|---|---|---|
| 2,202,900 | 6/1940 | Draper | 73/115 |
| 2,355,088 | 8/1944 | Lavoie | 73/115 |
| 3,171,989 | 3/1965 | Hatschek | 73/DIG. 4 |
| 3,198,013 | 8/1965 | Erdely | 73/723 |
| 3,216,244 | 11/1965 | Borchers | 73/115 |
| 3,244,006 | 4/1966 | Delmonte | 73/115 |
| 3,505,862 | 4/1970 | List et al. | 73/753 |
| 3,633,410 | 1/1972 | Isaev | 73/115 |
| 3,943,759 | 3/1976 | Kato et al. | 73/115 |
| 3,983,748 | 10/1976 | Isaev | 73/115 |
| 4,122,706 | 10/1978 | Schmidt | 73/115 |
| 4,169,387 | 10/1979 | Krempl | 73/115 |
| 4,169,388 | 10/1979 | Teitelbaum et al. | 73/DIG. 4 |

Primary Examiner—Donald O. Woodiel
Attorney, Agent, or Firm—George H. Dunsmuir; William R. Hinds

[57] ABSTRACT

The maximum pressure in a cylinder of an internal combustion engine is measured by a device which includes a pressure transducer housed in a water cooled, tubular body, one end of which can be connected to an engine indicator cock, and the other end of which is provided with a handle containing the transducer leads. The signal from the transducer is fed through signal conditioning and amplification, peak detector and comparator devices to a microprocessor which provides a visual, numerical indication of peak engine firing pressure.

6 Claims, 4 Drawing Figures

POWER CYLINDER BALANCER UNIT

BACKGROUND OF THE INVENTION

This invention relates to a device for measuring pressure, and in particular to a device for measuring the maximum pressure in a cylinder of an internal combustion engine.

The maximum pressure in a cylinder of an internal combustion engine is typically measured by somewhat complicated mechanical or electromechanical devices. Typical of such devices are those disclosed by U.S. Pat. Nos. 2,202,900, issued to C. S. Draper on June 4, 1940; 2,355,088, issued to S. D. Lavoie on Aug. 8, 1944; 3,216,244, issued to G. W. Borchers on Nov. 5, 1965; 3,633,410, issued to A. A. Isaev on Jan. 11, 1972; 3,943,759, issued to T. Kato et al on March 16, 1976; and 3,983,748, issued to A. A. Isaev on Oct. 5, 1976. Some of the devices, for example, the Draper and Lavoie apparatus, rely on the movement of a rigid diaphragm which is translated into an electromagnetic signal indicative of the rate of change of pressure within a cylinder. Others, including the Borchers device, use spring or valve movement as a means of measuring pressure.

In any event, it is readily apparent from a review of the prior art that a need exists for a simple, accurate device for measuring the maximum pressure in a cylinder of an internal combustion engine.

The object of the present invention is to attempt to meet such need by providing a relatively simple device for accurately measuring the maximum pressure in a cylinder of an internal combustion engine.

SUMMARY OF THE INVENTION

Accordingly, the present invention relates to a device for measuring the pressure in a cylinder of an internal combustion engine comprising a tubular body; inlet means in said body; connector means on said body for connecting said inlet means to an indicator cock on an internal combustion engine to place the body in fluid communication with a cylinder of the engine; pressure transducer means in said body for producing an electrical signal dependent on the pressure in said cylinder; cooling means integral with said body for cooling the body; and means for connecting said transducer means to an indicator circuit for receiving said electrical signal and providing a visual indication of cylinder pressure.

The particular cooling means referred to above is a finned exterior on the transducer casing which is surrounded by a water reservoir, i.e. the pressure probe defined by the casing has a self-contained or integral water cooling system. Accordingly, the device can operate without air or water cooling hoses attached thereto. The water cooling system functions even when the water is boiling, the boiling water still providing adequate cooling.

The use of the device of the present invention permits one person to balance rapidly the load required among the cylinders of internal combustion engines. By observing the fluctuation of peak firing pressures from cycle to cycle, the suitability of a given air/fuel ratio can be determined, and the necessary corrections can be made to produce regular combustion from cycle to cycle. Detonation spikes caused by a rich air-fuel mixture can be detected. By temporarily removing spark ignition or fuel, the running compression pressures are taken to provide a rapid evaluation of the condition of the cylinder walls, piston rings and valves.

BRIEF DESCRIPTION OF THE DRAWINGS

The invention will now be described in greater detail with reference to the accompanying drawings, which illustrate a preferred embodiment of the invention, and wherein.

DESCRIPTION OF THE PREFERRED EMBODIMENT(S)

Figure 1:
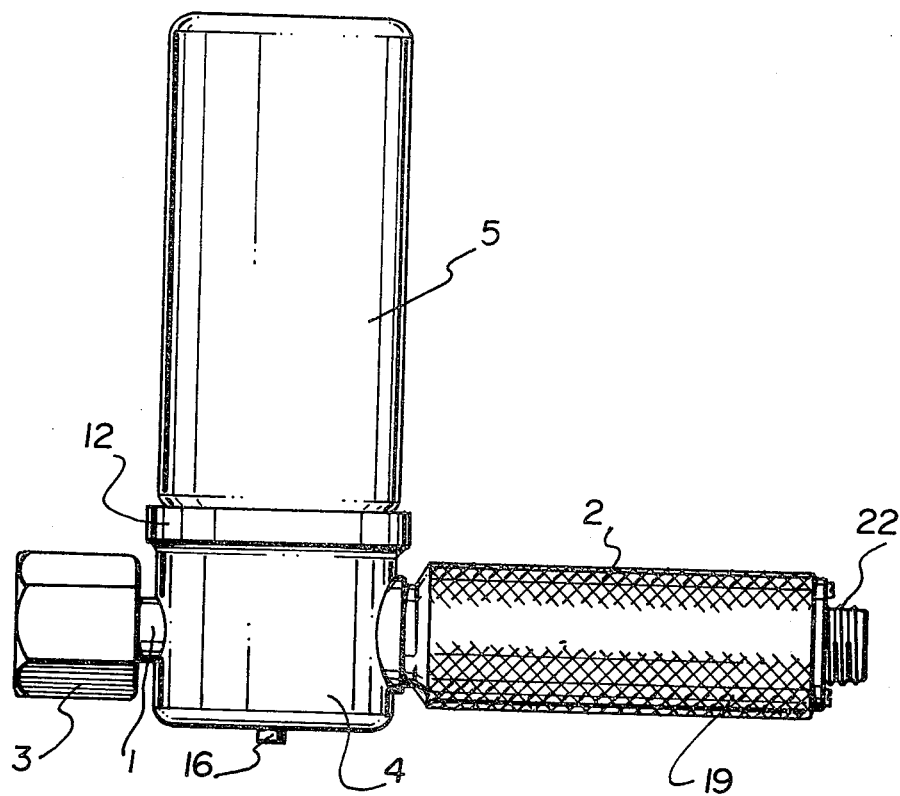
FIG. 1 is an elevation view of a pressure measuring device in accordance with the present invention.
Figure 2:
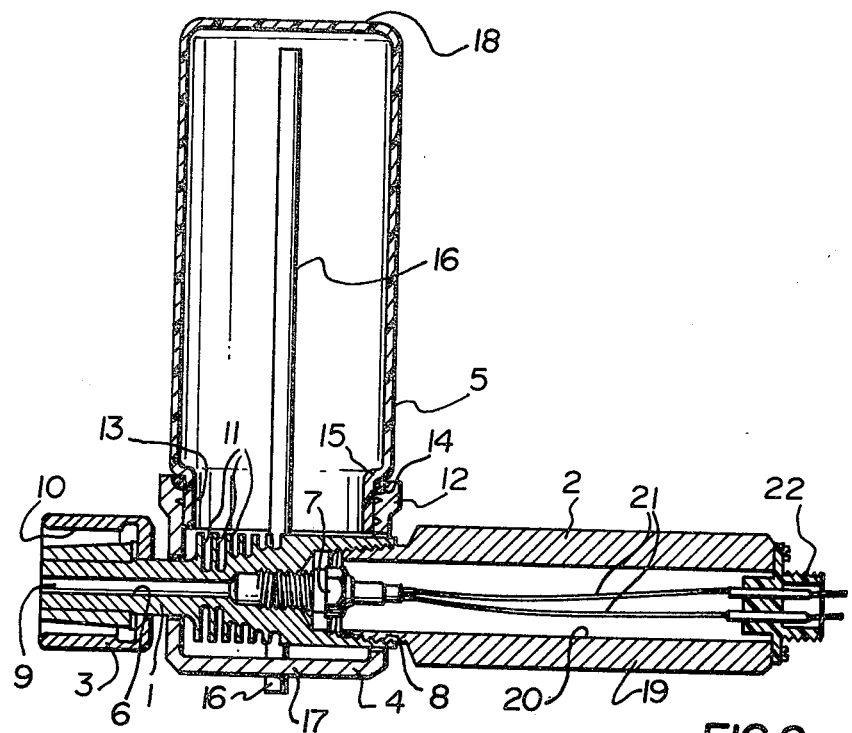
FIG. 2 is a longitudinal sectional view of the measuring device of FIG. 1.
Figure 3:
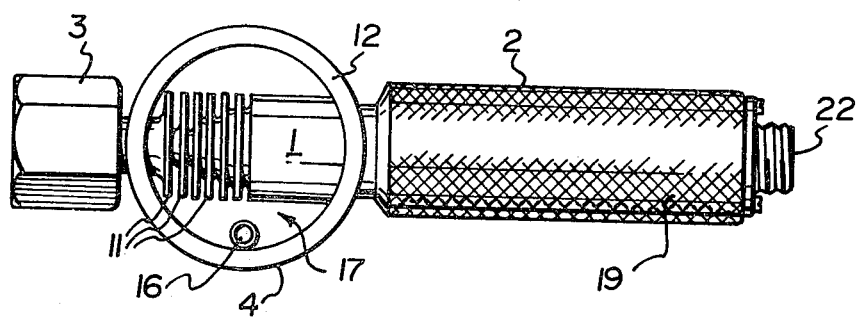
FIG. 3 is a plan view of the measuring device of FIGS. 1 and 2 with parts removed.

With reference to FIGS. 1 to 3, the pressure measuring device of the present invention includes an elongated tubular body 1 with a handle 2 at one end thereof and a connector 3 at the other end thereof for connecting the body 1 to an indicator cock (not shown) on an internal combustion engine. The area of the body 1 between the handle 2 and the connector 3 is surrounded by a coolant container defined by a cup-shaped base 4 and bottle-shaped top 5.

Referring specifically to FIGS. 2 and 3, the body 1 is generally cylindrical with a longitudinally extending central passage 6. The passage 6 is stepped at one end and internally threaded for receiving a pressure transducer 7 and one externally threaded end 8 of the handle 2. Inlet end 9 of the body 1 receives the connector 3. The nut-shaped connector 3 is rotatably mounted on the body 1 and is internally threaded at 10 for mounting on the indicator cock. Annular fins 11 are provided on the portion of the body 1 within the base 4 of the coolant container for ensuring efficient cooling of the body 1.

The base 4 of the coolant container includes an internally threaded open top end 12 for receiving externally threaded neck 13 of the plastic top 5. An O-ring 14 between shoulder 15 of the top end 12 of the base 4 provides for a fluid-tight seal. A vent tube 16 extends upwardly through bottom wall 17 of the base 4 to closed top 18 of the plastic top 5.

The handle 2 includes a knurled exterior surface 19, and a longitudinally extending central passage 20 through which leads 21 from the transducer 7 extend. The transducer leads 21 pass through a plastic grommet 22 in the outer end of the handle 2 to the electronic circuit illustrated in FIG. 4.

OPERATION

Figure 4:
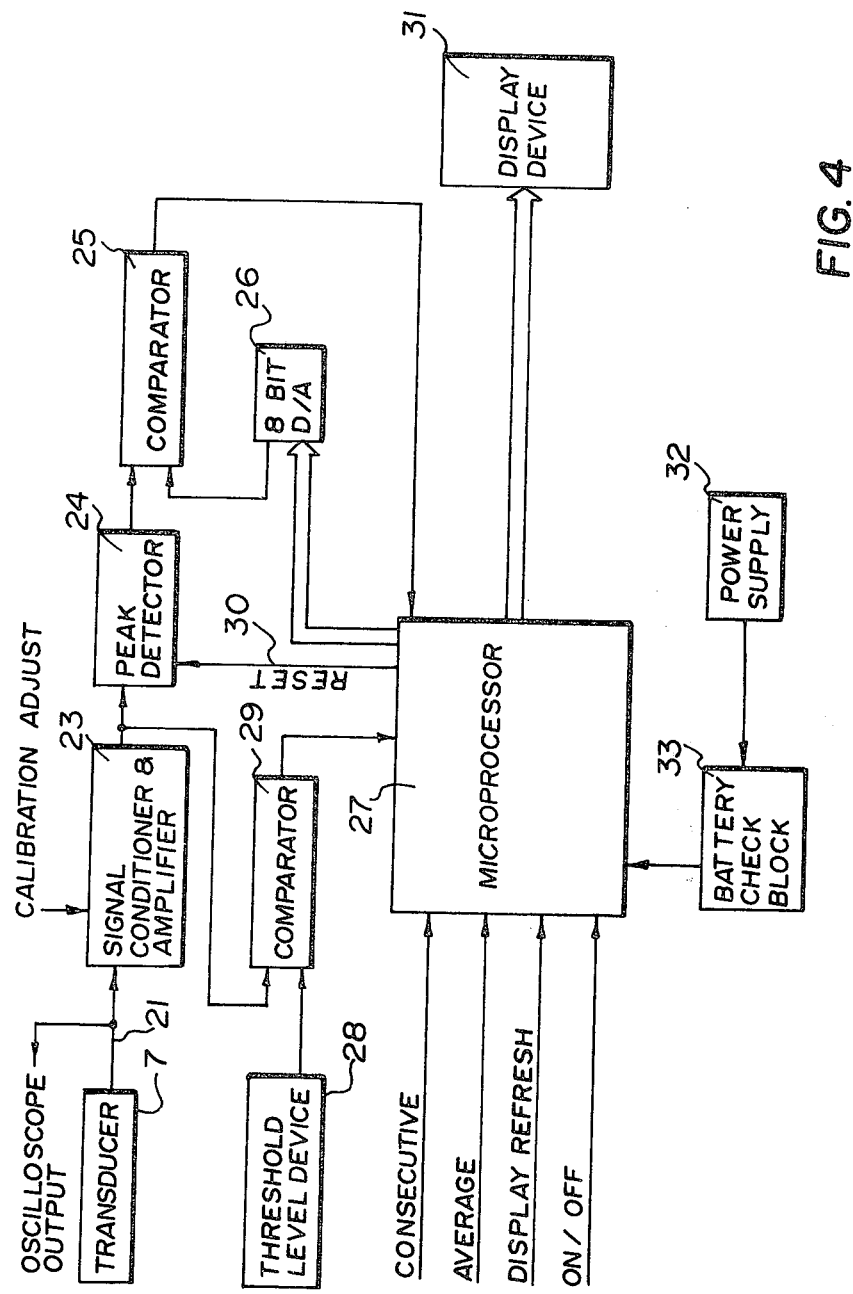
FIG. 4 is a circuit diagram of the electronic circuit employed with the device of FIGS. 1 to 3.

The operation of the device will now be described primarily with reference to FIG. 4.

In operation, the connector 3 is connected to the indicator cock of an engine. The body 1, being formed of mild steel with fins 11, is designed to provide maximum surface area for effective heat transmission. The mild steel cup defining the base 4 defines a portion of a water container, which includes the top portion 5 defined by an inverted plastic bottle. The vent tube 16 prevents pressure buildup in the coolant container. The plastic top 5 is a safety feature because the plastic will melt if the temperature of the steel base rises above 150° C. The transducer 7 in body 1 and the leads 21 form part of the electronic circuit of FIG. 4. The pressure transducer 7, which is of the piezo-electric type having a built in amplifier providing a high level low impedance output, is a standard product of the type made by PCB Piezontronics, Buffalo, N.Y. The signal from the transducer 7 is fed into a signal conditioning and amplifying device 23. The signal consists of an A.C. component and a D.C. component. In the device 23, the D.C. component of the signal is removed and the A.C. component is clamped above zero volts, i.e. raised above zero volts with the lowest level of the A.C. signal corresponding to zero volts. The signal is then amplified, with a variable adjustment, to a fixed sensitivity (psi or kPa per volt) level. The adjustable amplification is required because of the variable sensitivities of transducers. The device 23 is followed by a peak detector 24 which stores the highest voltage level reached by the signal since the last time the peak detector was reset, such level corresponding to the peak firing pressure.

A comparator 25 and an eight bit D/A 26 define an analog to digital converter. The voltage level stored by the peak detector is converted to numerical form by the converter. The converter is a successive approximation type, conversion logic being implemented by the software program of a microprocessor 27.

Control and operation of the system is effected by the microprocessor 27. The microprocessor uses the relationship of the signal level to a predetermined threshold level to derive power cylinder cycle timing information with which to perform an "average" or "consecutive" operation. The information is provided to the microprocessor 27 by threshold level and comparator devices 28 and 29 respectively. Thus, when either "average" or "consecutive" functions are requested, the microprocessor 27 measures the peak signal levels as framed by the timing information, i.e. controls the peak detector 24 through a reset line 30, converts the levels into numerical form and displays the results on light emitting diode (LED) display device 31. Upon receiving a "display refresh" request, the microprocessor re-displays the last message or result.

The circuit is completed by a power supply 32 and a battery check block 33. The microprocessor 27 also checks the level or charge of the batteries or power supply using the battery check block 33 and displays an appropriate message when the battery level is low.

PRACTICAL AND THEORETICAL CONSIDERATIONS

The device described hereinbefore has been tested on engines at speeds ranging from 250 rpm to 630 rpm with good results. Theoretically, the device will work from 15 to 20,000 rpm. The pressures measurable are determined by the sensitivity of the transducer. Normally, a transducer providing maximum pressure of 1,000 psi (7,000 kPa) and capable of detecting compression pressures as low as 80 psi (560 kPa) would be used in the device. These limits are readily adjustable by changing software in the case of the upper limit, and by changing a resistor in the case of the lower limit. The ability of the system to read high pressures, i.e. above 999 psi (7,000 kPa) is limited by the transducer (maximum linear range of 1,000 psi) and by the 3 digit display. In order to obtain 3 digit resolution below 999 psi, numbers over 999 could not be displayed. Of course, a higher pressure transducer, i.e. 5,000 psi maximum and a 4 digit display could be used. The minimum readable pressure is determined by the threshold level device, which prevents the digital to analog converter from accepting signals below the threshold level. Thus, the system is prevented from detecting peaks due to spurious low level electrical noise rather than a peak due to pressure rise. The amplitude of the spurious low level electrical noise is variable from engine to engine, and originates primarily from the ignition system. The threshold level can readily be set below any known compression pressures so that maximum protection from noise is achieved while compression pressures of any known engine can be obtained.

Further modifications and alternative embodiments of the invention will be apparent to those skilled in the art in view of the foregoing description. Accordingly, this description is to be construed as illustrative only and is for the purpose of teaching those skilled in the art, the manner of carrying out the invention. It is further understood that the form of the invention herewith shown and described is to be taken as the presently preferred embodiment. Various changes may be made in the shape, size and general arrangement of components, for example equivalent elements may be substituted for those illustrated and described herein, parts may be used independently of the use of other features, all as will be apparent to one skilled in the art after having the benefits of the description of the invention.

What I claim is:

1. A device for measuring the pressure in a cylinder of an internal combustion engine comprising a body; inlet means in said body; connector means on said body for connecting said inlet means to an internal combustion engine to place the inlet means and hence the body in fluid communication with a cylinder of the engine; pressure transducer means in said body for producing an electrical pressure signal dependent on the pressure in said cylinder; cooling means integral with said body for cooling the body, said cooling means comprising fins on said body, a liquid container carried by said body surrounding said fins, and a vent tube in said container connecting the interior of the container to the atmosphere; and means for connecting said transducer means to an indicator circuit for receiving said electrical pressure signal and providing an indication of cylinder pressure.

2. A device according to claim 1, wherein said transducer is a piezoelectric pressure transducer including a builtin amplifier.

3. A device according to claim 1 or 2, wherein said indicator circuit includes converter means for receiving the pressure signal from the transducer means and converting said pressure signal into numerical form; threshold level and comparator means for providing a reference level signal; a microprocessor for comparing said pressure and reference level signals and producing an output; and a display device for receiving said output and providing said visual indication of cylinder pressure.

4. A device according to claim 1 wherein said container is releasably sealed around said fins, and includes a top portion releasably sealed to a base portion, said base portion being mounted on said body.

5. A device according to claim 4 wherein said body is generally tubular and is formed with said connector means at one end and a handle at its other end, said fins being located on an intermediate portion of said body, and said container extending transversely from said intermediate portion so as to separate said connector means from said handle.

6. A device according to claim 4 wherein said top portion of the container is of plastic material so as to melt if the temperature of said body rises above a predetermined temperature.

* * * * *